(No Model.)

A. LEININGER & E. M. SCHREINER.
TRICYCLE.

No. 497,028. Patented May 9, 1893.

Witnesses
S. J. Cross
James Sterling

Inventors
Augustus Leininger
Edward M. Schreiner
By Fred W. Bond
Attorney

THE NORRIS PETERS CO., PHOTO-LITHO., WASHINGTON, D.C.

UNITED STATES PATENT OFFICE.

AUGUSTUS LEININGER AND EDWARD M. SHREINER, OF CANTON, OHIO.

TRICYCLE.

SPECIFICATION forming part of Letters Patent No. 497,028, dated May 9, 1893.

Application filed November 26, 1892. Serial No. 453,259. (No model.)

*To all whom it may concern:*

Be it known that we, AUGUSTUS LEININGER and EDWARD M. SHREINER, citizens of the United States, residing at Canton, in the county of Stark and State of Ohio, have invented certain new and useful Improvements in Tricycles; and we do hereby declare that the following is a full, clear, and exact description of the same, reference being had to the annexed drawings, making a part of this specification, and to the letters and figures of reference marked thereon, in which—

Figure 1:
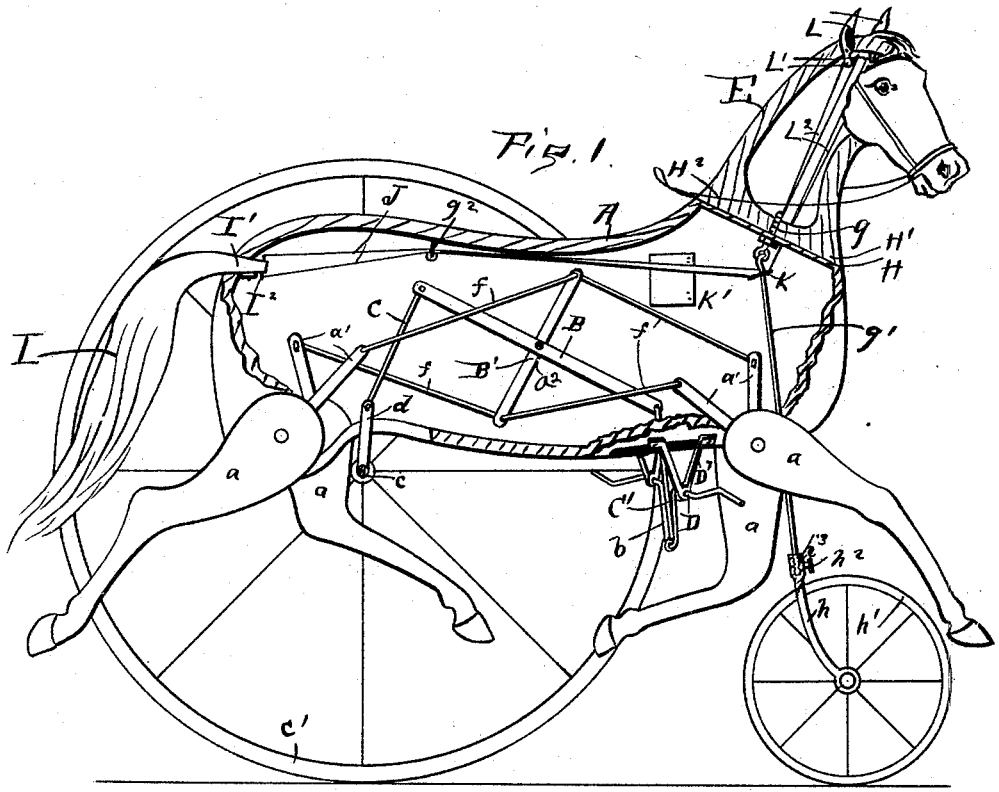
Figure 2:
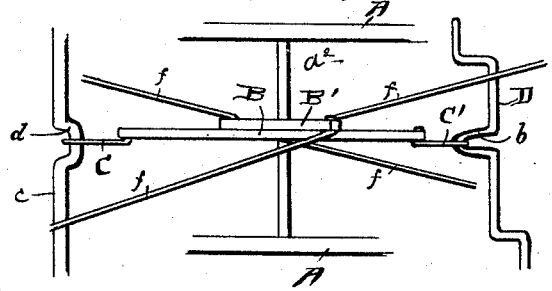

Figure 1 is a longitudinal section. Fig. 2, is a view of the mechanism for communicating rotary motion to the rear axle, and movement to the pivoted legs.

The present invention has relation to tricycles, and it consists in the different parts and combination of parts hereinafter described and particularly pointed out in the claims.

Similar letters of reference indicate corresponding parts in all the figures of the drawings.

In the accompanying drawings A represents the body, which in this instance is that of a horse, and is preferably formed in two pieces or halves, and the pieces or halves united together in any convenient and well known manner.

To the body A, are pivotally attached the legs $a$, which legs are provided with the arms $a'$, said arms being securely attached to the top or upper ends of the legs $a$, and are located substantially as illustrated in Fig. 1.

The body A is formed hollow, and is so formed for the purpose of providing a means for adjusting the mechanism to be located within the body, and at the same time to make the body light.

To the body A is pivoted the walking beam B, which walking beam is provided at each end thereof with the pitmen C and C'. The pedal-shaft D is properly journaled to the bracket D', which bracket is securely attached to the bottom or under side of the body A. The pedal shaft D, is provided with the crank $b$, to which crank is journaled the bottom or lower end of the pitman C'. The axle $c$, is provided with the traveling wheels $c'$, and the crank $d$, to the bottom or lower end of which crank is journaled the pitman C. It will be understood that as rotary motion is communicated to the pedal shaft D, that a rocking motion will be imparted to the walking beam by means of the pitman C', which in turn communicates rotary motion to the shaft $c$, by means of the pitman C and the crank $d$. For the purpose of communicating motion to the legs $a$, the bar B', is provided, which bar works in unison with the walking-beam B. To the ends of the bar B', are attached the wires $f$, or their equivalents, which wires are connected to the top or upper ends of the arms $a'$.

To the body A is pivotally attached the head E, by means of the bar $g$. To the bottom or lower end of which bar is attached the top or upper end of the rod $g'$, which rod extends downward through the body, and its bottom or lower end is provided with the yoke $h$, which yoke carries the traveling-wheel $h'$. For the purpose of providing a means for better supporting the head in proper position, the plates H and H' are provided; the plate H being securely attached in any convenient and well known manner to the body A, and the plate H', securely attached to the head. For the purpose hereinafter described, said plates should be provided with suitable openings.

To the rear portion of the body A, is pivotally attached the tail I, by means of the shank I', which shank is provided with the cross arm I². To the cross arm I², are attached the cords J, which cords lead forward and are attached to the cross-bar K, said cross-bar being securely attached to the rod $g'$. To the top or upper portion of the head E, are pivotally attached the ears L, which ears are provided with the downwardly projecting arms L'. For the purpose of communicating movement to the ears L, the cords L², are provided, which cords are connected to the arms L', and to the cross-bar K. The bar $g$, is securely fixed to the head E, and moves with said head, which communicates movement to the bar or rod $g'$. It will be understood that as the head E, is turned upon its pivotal point, that movement will be communicated to the rod $g$, thereby communicating movement to the cross-bar K, which in turn communicates movement to the tail I, and the ears L, by means of the cords. The head E, is turned by means of the reins H².

For the purpose of holding the cords J, in in proper position, and at the same time hold the cords out of way of the walking-beam B and the bar B', the eye $g^2$, is provided, which eye may be located substantially as shown in the drawings.

For the purpose of providing a means for adjusting the different parts located within the body A, the door or opening K' is provided, which door or opening may be located substantially as shown in the drawings, or it may be located at any other desired point.

For the purpose of adjusting the front or forward portion of the body A, the rod $g'$ is adjustably attached to the yoke $h$, said rod $g'$ being securely held at the desired point of adjustment by means of the set-screw $h^2$; and for the purpose of better holding the yoke $h$, and the bar $g'$, in proper adjustment, the socket which receives the bottom or lower end of said bar may be provided with the teeth or notches $h^3$. The walking beam and the bar B', is securely held in proper position by means of the shaft $a^2$, which shaft is fixed to the body A.

It will be understood that by providing a walking-beam B, and the pitmen C and C', that no chain or sprocket wheels are employed to communicate rotary motion to the rear axle, thereby reducing the cost and at the same time making the device more compact.

The object of forming the plates H H' open is to permit the ends leading to the ears to pass said plates.

Having thus fully described our invention, what we claim as new, and desire to secure by Letters Patent, is—

The combination of the body A, provided with the pivoted legs $a$, and means for communicating motion to said legs, the walking-beam B, the pitmen C and C', the pedal-shaft D, the shaft $a^2$, and the cranks $d$ and $b$, all arranged substantially as and for the purpose specified.

In testimony that we claim the above we have hereunto subscribed our names in the presence of two witnesses.

AUGUSTUS LEININGER.
EDWARD M. SHREINER.

Witnesses:
JAMES STERING,
F. W. BOND.